3,419,568
DERIVATIVES OF 1,2,3,4-TETRAHYDRO-
5H-PYRIDO[4,3b]INDOLES
Robert Phillip Johnson and John Paul Oswald, Waukegan,
Ill., assignors to Abbott Laboratories, North Chicago,
Ill., a corporation of Illinois
No Drawing. Filed Dec. 7, 1966, Ser. No. 599,695
6 Claims. (Cl. 260—294.9)

ABSTRACT OF THE DISCLOSURE 1,2,3,4-tetrahydro-5H-pyrido[4,3b]indoles having antidepressant and anti-psychotic activity.

---

This invention relates to 1,2,3,4-tetrahydro-5H-pyrido[4,3b]indoles. More particularly, the invention relates to compounds of the formula

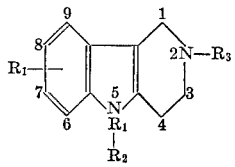

A wherein $R_1$ is hydrogen, lower alkoxy, cyano, halogen, or trifluoromethyl; $R_2$ is hydrogen, lower alkyl, dialkylaminopropyl, or γ-(p-fluorobenzoyl)propyl; and $R_3$ is hydrogen, lower alkyl, benzyl, cyclopropylmethyl, or 1,4-benzodioxan-2-ylmethyl, and acid-addition salt thereof such as the hydrochloride, hydrobromide, and sulfate salts, with the limitation that when $R_1$ is chlorine, bromine, or hydrogen and $R_2$ is hydrogen, $R_3$ is a substituent other than hydrogen or lower alkyl. The terms "lower alkyl" and "lower alkoxy" include the stragiht and branched alkyl and alkoxy radicals containing from one to four carbon atoms.

The compounds of this invention exhibit pharmacological activity and are therefore useful chemotherapeutic agents. The biological activity of these compounds is unique in that they combine significant anti-depressant activty, as measured by the "DOPA" test [G. M. Everett, F. Will, and A. Evans, Fed. Proc., 23, 198 (1964)], with anti-psychotic effects as measured by noting antagonism of known hallucinogenic agents such as Ditran [J. H. Biel, P. A. Nuhfer, W. K. Hoya, H. A. Leiser, and L. G. Abood, Ann. N.Y. Acad. Sci., 96, 251 (1962)]. For example, the compound of formula A wherein $R_1$ and $R_2$ are hydrogen and $R_3$ is 1,4-benzodioxan-2-ylmethyl shows prolonged activity in both tests at doses of 25 to 40 mg. per kilogram, given nitraperitoneally.

The compounds of the present invention are prepared by reacting an appropriately substituted arylhydrazine with a suitably substituted 4-piperidone derivative under acidic catalysis in a suitable solvent. Where desired, the products of this reaction can be converted to the more complicated derivatives through alkylation- or acylation-reduction sequences as described in the following examples.

Example 1.—2-benzyl-8-fluoro-1,2,3,4-tetrahydro-5H-pyrido[4,3b]indole hydrochloride To a slurry of 34.0 g. (0.21 mole) of p-fluorophenylhydrazine hydrochloride in 450 ml. of 2-propanol and 63 ml. of concentrated hydrochloric acid is added 43.0 g. (0.23 mole) of 1-benzyl-4-piperidone. After 4.5 hours of heating under reflux, the hot solution is filtered. The collected solid is washed with 2-propanol, cold water, washed again with 2-propanol, and finally with hexane. This crude material, M.P. 234°–240° (dec.), is recrystallized from methanol-2-propanol or from methanol-water to give the pure crystalline product, M.P. 245.5°–246.5° (dec.).

Example 2.—2-benzyl-8-methoxy-1,2,3,4-tetrahydro-5H-pyrido[4,3b]indole hydrochloride A mixture of 50.0 g. (0.29 mole) of p-methoxyphenylhydrazine hydrochloride and 57.0 g. (0.30 mole) of 1-benzyl-4-piperidone in 700 ml. of 2-propanol and 90 ml. of concentrated hydrochloric acid is heated under reflux for four hours. The solution is freed of by-product ammonium chloride by filtration while hot and again soon after cooling to room temperature. The filtrate, on prolonged refrigeration, deposits a crystalline solid which is collected, washed with cold 2-propanol, and dried. This crude product is dissolved in aqueous methanol, and an excess of aqueous potassium carbonate is added. A methylene chloride extract of this slurry is washed with water, treated with decolorizing carbon and a drying agent, filtered, and freed of solvent. The residual free base in 2-propanol solution is neutralized by addition of concentrated hydrochloric acid. The precipitated salt is recrystalized from aqueous methanol until pure and colorless, M.P. 214.5°–215.0° (dec.).

In similar fashion, the following compounds of this invention were prepared: 2-benzyl-8-chloro-1,2,3,4-tetrahydro-5H-pyrido[4,3b]indole hydrochloride, M.P. 249°–250° (dec.), and 2-benzyl-8-trifluoromethyl-1,2,3,4-tetrahydro-5H-pyrido[4,3b]indole hydrochloride, M.P. 268°–270°.

Example 3.—8-fluoro-1,2,3,4-tetrahydro-5H-pyrido[4,3-b]indole hydrochloride

A solution of 30.0 g. (0.095 mole) of 2-benzyl-8-fluoro-1,2,3,4-tetrahydro-5H-pyrido[4,3b]indole hydrochloride in aqueous ethanol is treated with hydrogen and a palladium-on-carbon catalyst. When hydrogen uptake ceases, the catalyst is removed by filtration and washed thoroughly. The filtrate and washings are combined and freed of solvent under reduced pressure. Recrystallization from methanol-water of the crystalline residue affords the pure product, which does not melt but decomposes above 300° C.

Employing similar methods, the following compounds were prepared: 8 - methoxy-1,2,3,4-tetrahydro-5H-pyrido[4,3b]indole hydrochloride, decomposes above 250°; and 8 - trifluoromethyl-1,2,3,4-tetrahydro-5H-pyrido[4,3b]indole hydrochloride, M.P. 270°–273° (dec.).

Example 4.—8-chloro-1,2,3,4-tetrahydro-5H-pyrido[4,3b]indole hydrochloride

A mixture of 29.2 g. (0.140 mole) of 4,4-diethoxypiperidine hydrochloride [S. M. McElvain and R. E. McMahon, J. Am. Chem. Soc., 71, 901 (1949)] and 26.0 g. (0.145 mole) of p-chlorophenylhydrazine hydrochloride in 200 ml. of 2-propanol and 30 ml. of concentrated hydrochloric acid is stirred and heated under reflux for 70 minutes. The crystalline product is collected from the cooled reaction mixture and rinsed well with cold 2-propanol and with diethyl ether. Recrystallization from water-methanol-2-propanol gives the pure product, M.P. 282°–284° (dec.).

Similarly prepared are 8-bromo-1,2,3,4-tetrahydro-5H-pyrido[4,3b]indole hydrochloride, M.P. 282°–284° (dec.), and 8-cyano-1,2,3,4-tetrahydro-5H-pyrido[4,3b]indole hydrochloride, M.P. 327°–330° (dec.).

Example 5.—2-(1,4-benzodioxan-2-ylmethyl)-1,2,3,4-tetrahyro-5H-pyrido[4,3b]indole hydrochloride A slurry of 9.2 g. (0.044 mole) of 1,2,3,4-tetrahydro-5H-pyrido[4,3b]indole hydrochloride [R. Robinson and S. Thornley, J. Chem, Soc., 125, 2169 (1924)], 7.7 g. (0.06 mole) of potassium carbonate, 10.0 g. (0.062 mole) of potassium iodide, and 13.0 g. (0.057 mole) of 2-bromomethyl-1,4-benzodioxane in 125 ml. of dry dimethylformamide is stirred at 85° for seven hours. The reaction mixture is cooled and distributed between water and methylene chloride. The organic extract is washed with water, dried over magnesium sulfate, filtered, and freed of solvent under vacuum. A 2-propanol solution of the residue is acidified with methanolic hydrogen chloride, precipitating the crude hydrochloride salt, M.P. 215°–222° (dec.). Recrystallization from methanol-water gives white needles of pure compound, M.P. 225°–227° (dec.).

Example 6.—2-methyl - 5 - (γ-dimethylaminopropyl)-1,2,3,4-tetrahydro-5H-pyrido[4,3b]indole dihydrochloride A solution of 5.0 g. (0.027 mole) of 2-methyl-1,2,3,4-tetrahydro-5H-pyrido[4,3b]indole [V. Boekelheide et al., J. Am. Chem. Soc., 72, 2132 (1950)] in 100 ml. of hot dimethylformamide is stirred with 1.44 g. (0.03 mole) of sodium hydride dispersion (50% in mineral oil). To this stirred suspension is added 3.66 g. (0.03 mole) of γ-dimethylaminopropyl chloride. The reaction mixture is stirred at reflux temperature for six hours, then cooled and diluted slightly with water. The solution is filtered, acidified, and extracted with hexane. The aqueous layer is concentrated briefly, treated with decolorizing carbon, filtered, made basic, and extracted with diethyl ether. The ethereal solution is washed liberally with water, dried, filtered, and treated with ethereal hydrogen chloride. The precipitated powder is collected quickly and crystallized from 2-propanol containing a small amount of methanol. Recrystallization from absolute ethanol gives the dihydrochloride salt, M.P. 254°–257° (dec.), as a slightly hygroscopic crystalline powder.

Similarly prepared is 2-benzyl-8-fluoro-5-(γ-dimethylaminopropyl)-1,2,3,4-tetrahydro-5H - pyrido[4,3b]indole dihydrochloride, M.P. 240°–242°.

Example 7.—2-(cyclopropylmethyl)-1,2,3,4-tetrahydro-5H-pyrido[4,3b]indole hydrochloride To a suspension of 5.0 g. (0.029 mole) of 1,2,3,4-tetrahydro-5H-pyrido[4,3b]indole in 40 ml. of dry pyridine is slowly added 3.78 g. (0.036 mole) of cyclopropylcarbonyl chloride in 20 ml. of benzene. When the exothermic reaction has subsided, the mixture is heated on a steam bath for 20 minutes. Workup in the usual way gives crystalline 2 - cyclopropylcarbonyl-1,2,3,4-tetrahydro-5H-pyrido[4,3b]indole, M.P. 185°–187° (from methanol). A solution of 3.85 g. (0.016 mole) of this amide in dry 1,2-dimethoxyethane is treated with 1.3 g. (0.032 mole) of lithium aluminum hydride. After stirring at 80° for 15 hours, the slurry is cooled and cautiously treated with 10% methanol in 1,2-dimethoxyethane until hydrogen evolution ceases. The resultant slurry is diluted with aqueous potassium carbonate and extracted with benzene several times. The combined organic solution is washed with water, dried, filtered, and concentrated to dryness. A solution of the residue in 2-propanol is acidified with methanolic hydrogen chloride, precipitating the crystalline salt, M.P. 233°–235° (dec.) after recrystallization from methanol-2-propanol.

Example 8.—4-(p-fluorophenyl)-4-4-ethylenedioxy-1-chlorobutane

In an appropriate reaction vessel are mixed 300 g. of γ-chloro-p-fluorobutyrophenone, 20 g. of p-toluenesulfonic acid hydrate, 130 g. of ethylene glycol, and 2.5 liters of benzene. This mixture is heated (stirring is optional) under reflux through an efficient water-separating device until water separation is complete (12 to 18 hours is usually sufficient). The resultant solution is cooled and washed with several portions of a 5% aqueous solution of sodium carbonate. After a final wash with saturated aqueous sodium chloride, the organic solution is dried (anhydrous magnesium sulfate is suitable), filtered, and subjected to fractional distillation under reduced pressure. The product distills at 162°–166° (15 mm.) or 144°–147° (10 mm.) with a refractive index of $n_D^{25}=1.505$. This material is sufficiently pure for use as an intermediate. Further purification may be achieved by dissolving the product fraction in a volatile, water-insoluble solvent such as diethyl ether, and washing this solution with several portions of water.

Example 9.—2-benzyl - 5 - [γ-(p-fluorobenzoyl)propyl]-1,2,3,4-tetrahydro-5H-pyrido[4,3b]indole hydrochloride A suspension of 5.24 g. (0.020 mole) of 2-benzyl-1,2,3,4-tetrahydro-5H-pyrido[4,3b]indole [N. P. Buu-Hoi, O. Roussel, and P. Jacquignon, J. Chem. Soc., 708 (1964)] in 60 ml. of dry dimethylformamide is treated with 1.2 g. (0.025 mole) of sodium hydride dispersion (50% in mineral oil). The red slurry is heated on a steam bath for 15 minutes with stirring, then is treated with 6.1 g. (0.025 mole) of 4-(p-fluorophenyl)-4-4-ethylenedioxy-1-chlorobutane (prepared by the method of Example 8) in 40 ml. of dimethylformamide. After 4.25 hours of continued heating and stirring, the slurry is cooled and cautiously treated with methanol. Solvent is removed under reduced pressure and the residue is triturated with aqueous acid and with hexane, then is distilled between aqueous alkali and ether. Several ether extracts are combined, washed with water, dried, filtered, and freed of solvent. The residual oil is dissolved in hot aqueous alcohol, and the solution is treated with decolorizing carbon, filtered, acidified with hydrochloric acid, and heated on a steam bath for 30 minutes. Slow cooling of the solution gives white needles of the product hydrochloride salt, M.P. 205°–208°.

What is claimed is:
1. A compound of the formula

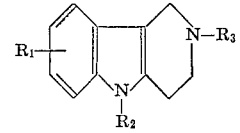

wherein $R_1$ is selected from the group consisting of hydrogen, methoxy, cyano, chloro, fluoro, and trifluoromethyl; $R_2$ is hydrogen; and $R_3$ is selected from the group consisting of hydrogen, benzyl, cyclopropylmethyl, and 1,4-benzodioxan-2-ylmethyl.

2. A compound as claimed in claim 1 wherein $R_1$ is selected from the group consisting of chloro, fluoro, methoxy, and trifluoromethyl; $R_2$ is hydrogen; and $R_3$ is benzyl.

3. A compound as claimed in claim 1 wherein $R_1$ is selected from the group consisting of fluoro, methoxy, and trifluoromethyl; $R_2$ is hydrogen; and $R_3$ is hydrogen.

4. A compound as claimed in claim 1 wherein $R_1$ is cyano, $R_2$ is hydrogen, and $R_3$ is hydrogen.

5. A compound as claimed in claim 1 wherein $R_1$ is hydrogen, $R_2$ is hydrogen, and $R_3$ is 1,4-benzodioxan-2-ylmethyl.

6. A compound as claimed in claim 1 wherein $R_1$ is hydrogen, $R_2$ is hydrogen, and $R_3$ is cyclopropylmethyl.

References Cited

UNITED STATES PATENTS

| | | | |
|---|---|---|---|
| 2,786,059 | 3/1957 | Horlein | 260—296 |
| 2,759,943 | 8/1956 | Horlein | 260—296 |

OTHER REFERENCES

Buu-Hoi: J. Chem. Soc., London (1964), pp. 708–711, QDIC6.

HENRY R. JILES, *Primary Examiner.*

A. L. ROTMAN, *Assistant Examiner.*

U.S. Cl. X.R.

260—296, 340.3, 592; 167—65